(12) United States Patent
Tajan et al.

(10) Patent No.: US 11,834,202 B2
(45) Date of Patent: Dec. 5, 2023

(54) DEVICE FOR DEPLOYING AND POINTING AN EQUIPMENT ITEM CARRIED BY A SPACECRAFT

(71) Applicant: AIRBUS DEFENCE AND SPACE SAS, Toulouse (FR)

(72) Inventors: Florent Tajan, Toulouse (FR); Gilles Pupille, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/926,044

(22) PCT Filed: May 11, 2021

(86) PCT No.: PCT/FR2021/050813
§ 371 (c)(1),
(2) Date: Nov. 17, 2022

(87) PCT Pub. No.: WO2021/234246
PCT Pub. Date: Nov. 25, 2021

(65) Prior Publication Data
US 2023/0182926 A1 Jun. 15, 2023

(30) Foreign Application Priority Data
May 19, 2020 (FR) ...................................... 2004989

(51) Int. Cl.
*B64G 1/22* (2006.01)
*B64G 1/10* (2006.01)

(52) U.S. Cl.
CPC ............... *B64G 1/222* (2013.01); *B64G 1/10* (2013.01)

(58) Field of Classification Search
CPC . B64G 1/222; B64G 1/10; F16H 21/46; B25J 9/003; B25J 9/0033; B25J 9/0045;
(Continued)

(56) References Cited

U.S. PATENT DOCUMENTS

| 6,477,912 B2 * | 11/2002 | Song | F16H 21/46 |
| | | | 901/29 |
| 2014/0151947 A1 * | 6/2014 | Brown | B23Q 1/4809 |
| | | | 269/58 |

(Continued)

FOREIGN PATENT DOCUMENTS

| EP | 2 648 281 | 10/2013 |
| EP | 3 213 999 | 8/2017 |
| FR | 2 672 836 | 8/1992 |

OTHER PUBLICATIONS

International Search Report for PCT/FR2021/050813, dated Aug. 9, 2021, 5 pages.
(Continued)

*Primary Examiner* — Medhat Badawi
*Assistant Examiner* — Vicente Rodriguez
(74) *Attorney, Agent, or Firm* — Nixon & Vanderhye P.C.

(57) ABSTRACT

A device for deploying and pointing an equipment item is disclosed including a mobile platform for receiving the equipment item, a carrier integrally secured to a wall of a spacecraft, and three identical linear actuators which connect the carrier to the mobile platform and are suitable for moving the platform in translation along one axis and for orienting the platform in rotation about two axes. Each linear actuator including a first portion connected to the platform by a universal joint, a second portion connected to the carrier by a pivot connection, a motor, and a screw/nut joint interconnecting the two portions, each universal joint being suitable for preventing the screw/nut joint from rotating about the axis, such that driving the motor causes a translational movement between the first and the second portion.

12 Claims, 5 Drawing Sheets

(58) Field of Classification Search
CPC .. B25J 9/0048; B25J 9/0063; Y10T 29/53038
See application file for complete search history.

(56) References Cited

U.S. PATENT DOCUMENTS

| | | | |
|---|---|---|---|
| 2017/0221376 A1* | 8/2017 | Gosselin | B25J 17/0216 |
| 2019/0296418 A1 | 9/2019 | Calmettes-Carensac | |
| 2020/0320897 A1* | 10/2020 | Veltena | A63G 31/16 |

OTHER PUBLICATIONS

Written Opinion of the ISA for PCT/FR2021/050813, dated Aug. 9, 2021, 5 pages.

* cited by examiner

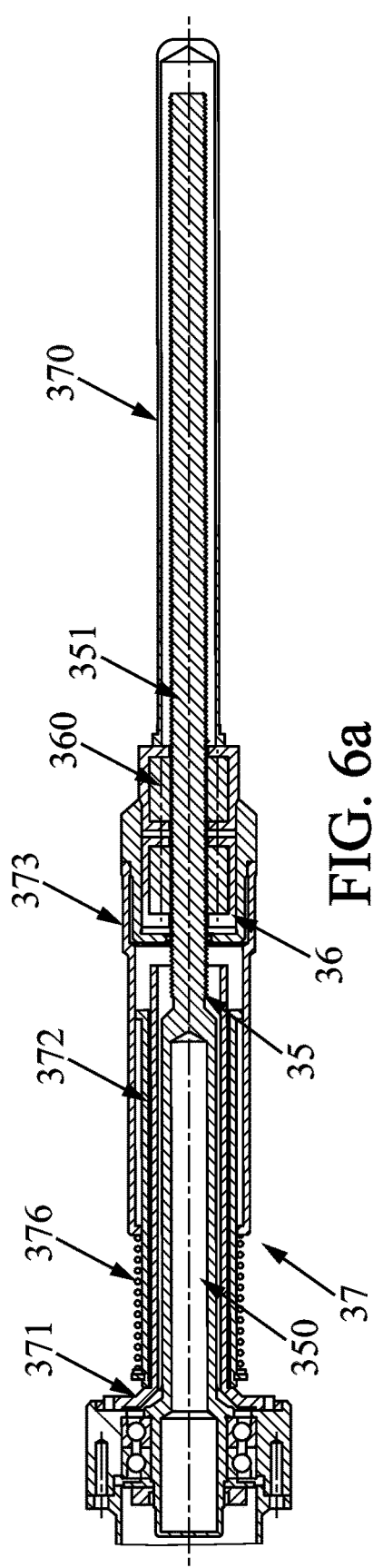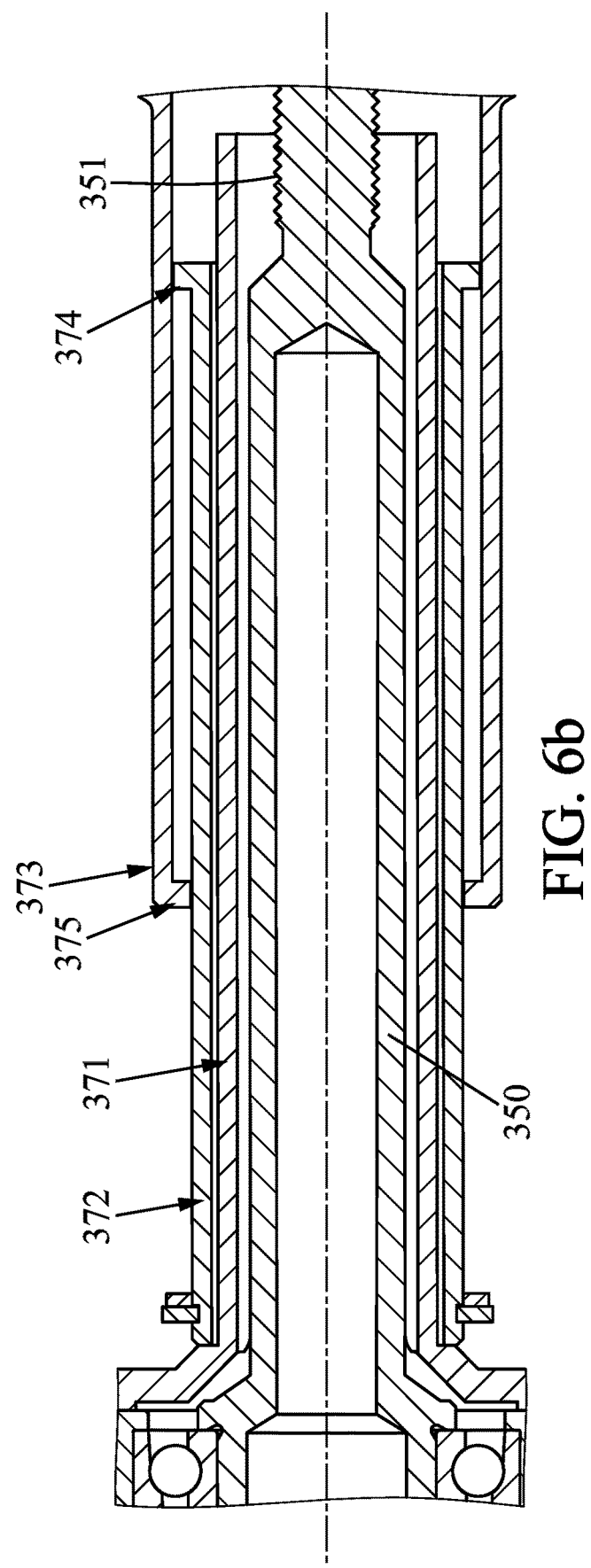

DEVICE FOR DEPLOYING AND POINTING AN EQUIPMENT ITEM CARRIED BY A SPACECRAFT

CROSS REFERENCE TO RELATED APPLICATIONS

The present application is a National Phase of International Application Number PCT/FR2021/050813 filed May 11, 2021, which designated the U.S. and claims priority benefits from French Application Number FR2004989 filed May 19, 2020, the entire contents of each of which are hereby incorporated by reference.

TECHNICAL FIELD

This application relates to a device for deploying and pointing an equipment item, the device being integrally secured to a spacecraft such as a satellite or a space probe. The application applies for example to the deployment and pointing of optical instruments such as telescopes.

PRIOR ART

In space missions, it is desired to be able to orient an equipment item on board a spacecraft so as to place it in operational condition. For example, for observation missions, one wishes to enable an optical instrument to point to a target from a spacecraft, whether the target is on Earth or in space. It may also be needed to orient other types of equipment such as antennas, reflectors, thrusters, etc. To do so, it is necessary to use a pointing mechanism enabling at least two degrees of freedom in rotation.

In particular, it is known to mount the equipment item on a swiveling carrier. In this case, it may be advantageous for the mobile carrier to have a third degree of freedom in translation, on the one hand to allow bringing the equipment item into a position located outside the field of operational movement, in order to stack it at launch, but on the other hand to allow more freedom in the movements of the equipment item. In terms of kinematics, a third degree of freedom can allow providing the equipment item with a path that prevents it from colliding with other components of the spacecraft. In terms of dynamics, a third degree of freedom can allow moving the center of rotation of the equipment item and better controlling the inertia problems seen by the actuators.

Thus, a device for deploying and pointing an optical instrument such as a telescope is known from document EP 3 213 999, comprising a mobile platform on which the instrument is mounted, and a set of actuators connecting the mobile platform to a frame of the satellite, the actuators being used to deploy the platform from a stacked position and to orient it.

All the actuators are formed of a mandrel connected to a linear element assembled to the platform, and the position of the platform is adjusted by adjusting the length of the linear element for each actuator by unwinding or winding the linear element onto the corresponding mandrel.

However, this device has several disadvantages related to the structure of the actuators. First, due to their geometry, the linear elements cannot provide sufficient rigidity for the deployment and orientation of heavy loads or massive instruments. Moreover, even if rigid linear elements are developed, it is then difficult to wind them on mandrels and it is necessary to use mandrels having a relatively large radius, which increases the space occupied by the device and decreases its precision.

There is therefore a need to improve the situation.

SUMMARY

In view of the above, one aim of the invention is to propose a device for deploying and pointing an equipment item that can have a higher mass and that allows increased precision compared to the prior art.

Another aim of the invention is to provide a device having good resistance to the forces generated during launch of the spacecraft carrying the device and equipment item.

In this regard, the object of this application is a device for deploying and pointing an equipment item, comprising:
  a mobile platform for receiving the equipment item,
  a carrier integrally secured to a wall of a spacecraft, and
  three identical linear actuators connecting the carrier to the mobile platform,
the actuators being suitable for moving the mobile platform in translation along an axis and for orienting the mobile platform in rotation about two axes, characterized in that each linear actuator comprises:
  a first portion connected to the mobile platform by a universal joint,
  a second portion connected to the carrier by a pivot connection,
  a motor, and
  a screw/nut joint interconnecting the first and second portion,
the universal joint of each actuator being suitable for preventing rotation about the axis of the screw/nut joint, such that rotational actuation of the screw or nut by the motor causes a translational movement between the first and the second portion.

Advantageously, but optionally, the device for deploying and pointing further comprises at least one of the following features.

In one embodiment, the linear actuators are suitable for moving the mobile platform for receiving the equipment item, between a stacked position and at least one operational position, and the carrier and the mobile platform are adapted such that, in the stacked position, the mobile platform bears against the carrier at three support points respectively adjacent to each linear actuator.

In one embodiment, the mobile platform and the carrier are adapted so as to establish, in the stacked position, three sphere-chute type connections between the mobile platform and the carrier, the axes of the sphere-chute connections not being parallel to each other.

In one embodiment, the three sphere-chute connections are evenly distributed over a circle, the axes of the chutes extending radially relative to the circle.

In one embodiment, the device for deploying and pointing further comprises a launch holding device which is suitable for holding the mobile platform, in the stacked position, against the carrier during launch of the spacecraft.

In one embodiment, the device for deploying and pointing is further dimensioned to allow, in the stacked position, a transmission of greater forces via the support points than via the linear actuators.

In one embodiment, each universal joint comprises at least one flexible strip suitable for limiting the forces that can be transmitted from the platform to the corresponding linear actuator.

In one embodiment, the actuators are arranged, relative to the carrier and to the receiving platform, such that each among the carrier and the platform are symmetrical with respect to a central symmetry.

In one embodiment, each screw/nut joint is formed by a roller screw. The roller screw may then comprise: a screw, comprising a shank and a threaded rod; a threaded nut mounted on the threaded rod; and a sheath extending around the screw and nut and housing a lubricant, the sheath comprising:
- a first sheath portion connected to the nut and covering the free end of the threaded rod of the screw, said first sheath portion being closed at one end, this end being located at the free end of the threaded rod,
- a fixed second sheath portion covering the shank of the screw,
- a third sheath portion slidingly mounted on the second portion, and
- a fourth sheath portion connected to the nut, and extending from the nut to the shank of the screw so as to partly cover the third portion, wherein the third and fourth sheath portions are adapted to prevent the escape of lubricant from the sheath.

Another object relates to a method for deploying a device according to the preceding description, the device being mounted on a satellite, and initially being in a stacked position in which the mobile platform is resting against the carrier, the method comprising a controlling of each linear actuator so as to move the mobile platform in translation away from the carrier, and controlling each actuator to orient the platform in at least one predetermined direction.

Another object relates to a computer program product, comprising code instructions for implementing the method according to the above description, when it is implemented by a computer.

The proposed device makes it possible to achieve the objectives stated above by means of linear actuators comprising a screw/nut joint and two portions respectively connected to a platform for receiving the instrument to be pointed and to a carrier of the spacecraft. The screw/nut joint makes it possible to obtain very good precision in the positioning and pointing of the equipment item, due to the high reduction ratio that can be obtained between the rotation of the motor and the translation of the actuator.

The device also has good resistance during launch, since it allows bringing the platform for receiving the instrument to be pointed into a stacked position, in which, for each actuator, an additional and neighboring support point of the actuator is established between the platform and the carrier, allowing transmission of the forces between the platform and the carrier via this support point and not via the actuator. Flexibilities are also introduced into the actuators, to ensure that launch-related stresses travel via the additional support points and not via the actuators.

BRIEF DESCRIPTION OF DRAWINGS

Other features, details, and advantages will become apparent upon reading the detailed description below, and upon analyzing the appended drawings, in which:

FIG. 6a shows an example of a roller screw used in a device for deploying and pointing according to one embodiment.

FIG. 6b is an enlarged view of the roller screw shown in FIG. 6a.

DESCRIPTION OF EMBODIMENTS

Figure 1A:
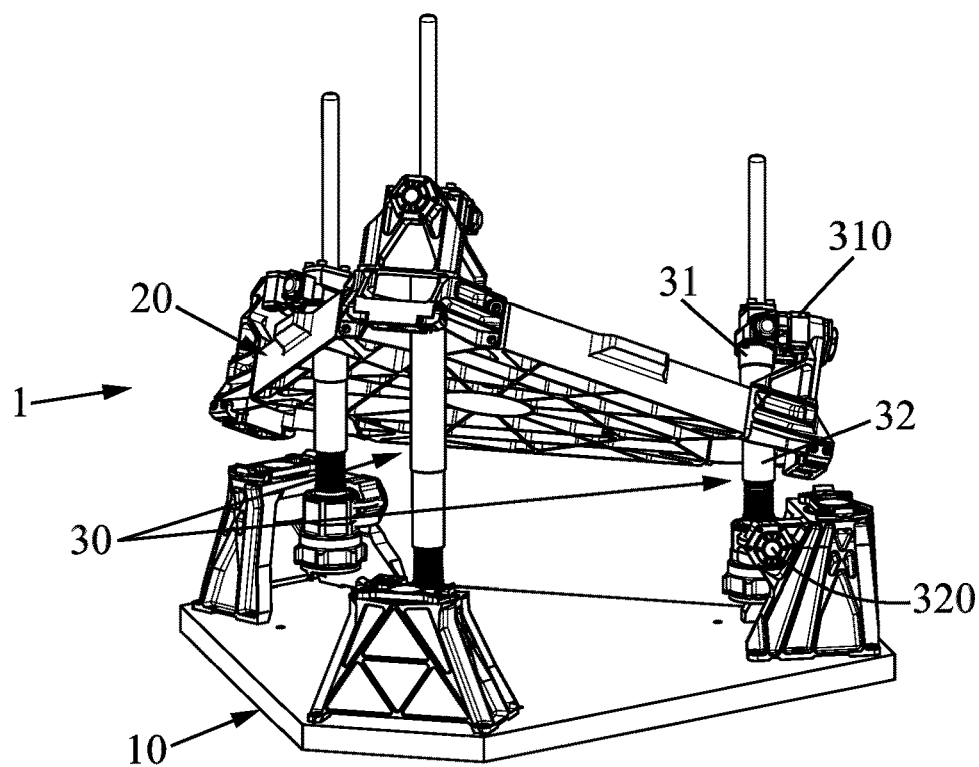
FIG. 1a shows a device for deploying and pointing according to one embodiment, in an operational configuration.
Figure 1B:
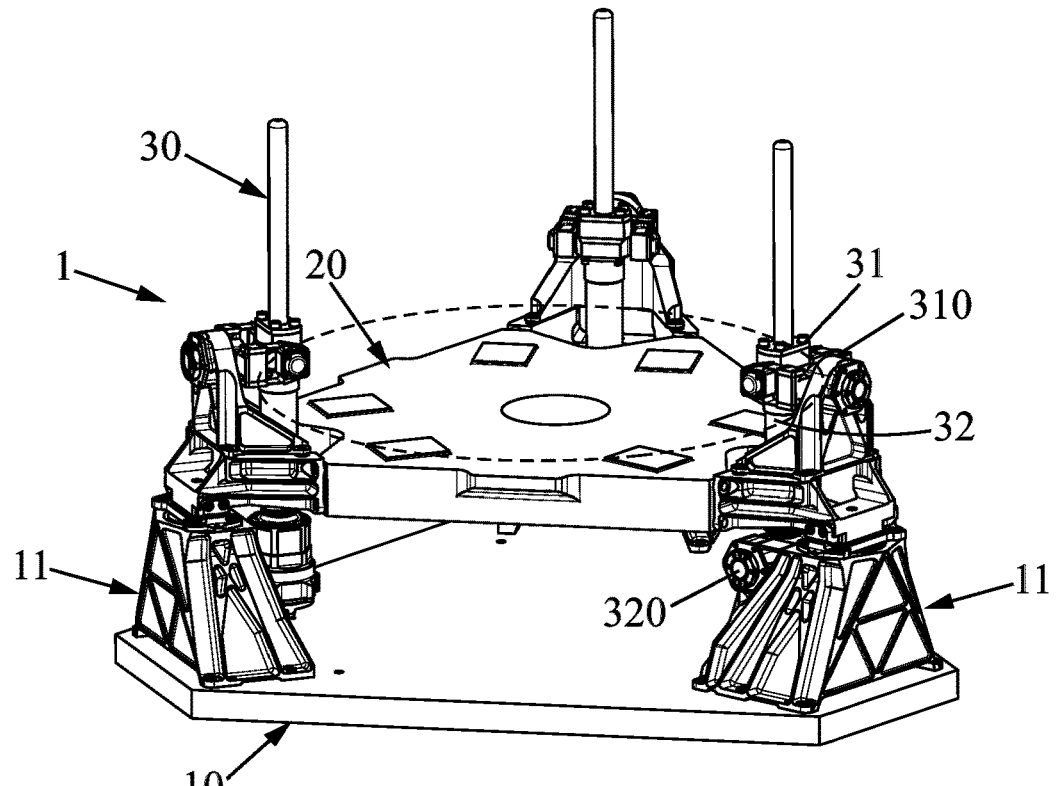
FIG. 1b shows a device for deploying and pointing according to one embodiment, in a stacked configuration.
Figure 2:
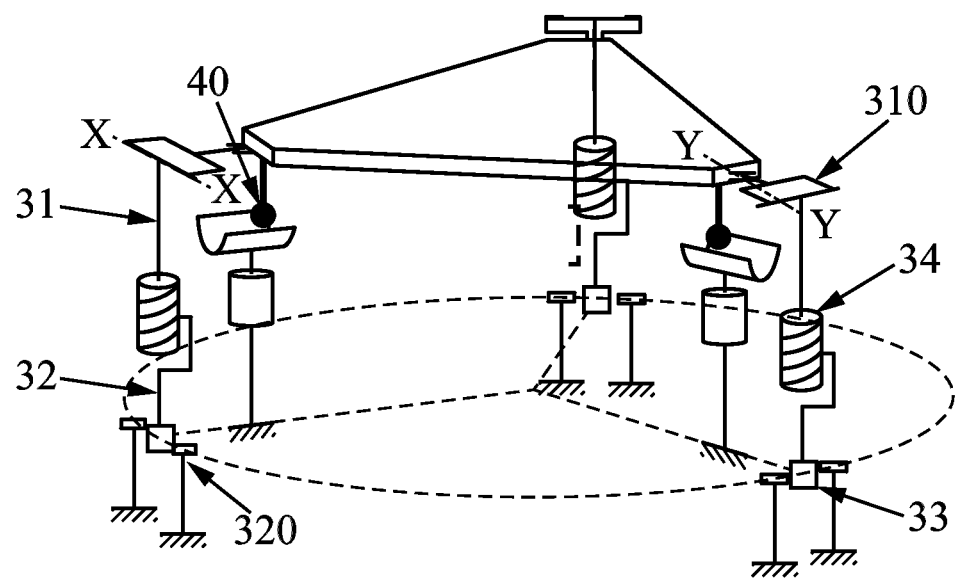
FIG. 2 is a kinematic diagram of the device for deploying and pointing according to one embodiment.
Figure 3:
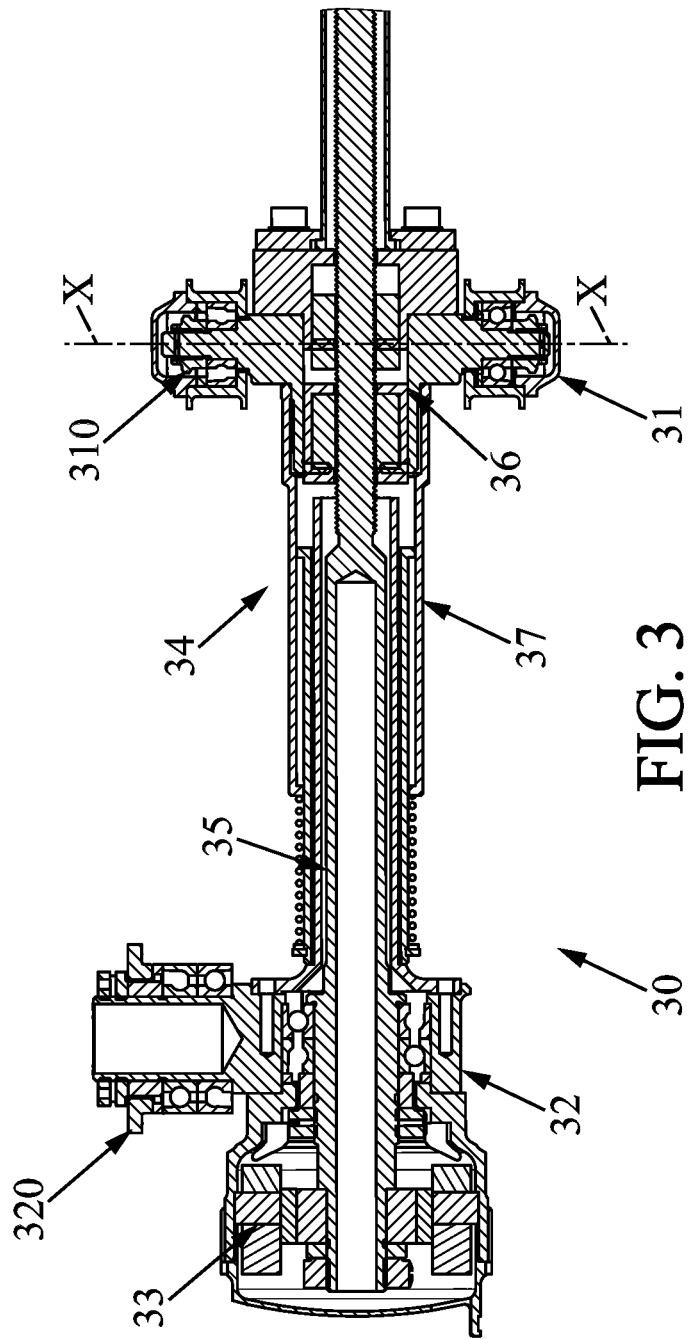
FIG. 3 shows an example of a screw/nut joint of a linear actuator of the device for deploying and pointing.

With reference to FIGS. 1a and 1b, an example is shown of a device 1 for deploying and pointing an equipment item (not shown). The equipment item may be an optical instrument, for example a telescope. It may also be a laser pointer. Alternatively, the equipment item may be any other load carried by a spacecraft and which can advantageously be oriented, for example such as an antenna, a reflector, a thruster, etc.

The device 1 is suitable for being fixedly mounted to a spacecraft (not shown) such as a satellite. In this respect, it comprises a carrier 10 integrally secured to a wall of the spacecraft. In one embodiment, the carrier 10 of the device 1 may even be integrated into a wall of the spacecraft, i.e. it is part of a wall of the spacecraft.

The device 1 also comprises a platform 20 for receiving the instrument, on which the equipment item is fixedly mounted. This platform 20 is movable relative to the spacecraft and relative to the carrier 10, according to three degrees of freedom comprising one degree of translation and two degrees of rotation about axes of rotation preferably perpendicular to the direction of translation. For example, the direction of translation may be perpendicular to the plane of the carrier 10, and the axes of rotation may be perpendicular to each other.

To set the platform 20 in motion according to these degrees of freedom, the device 1 comprises three identical actuators 30, connecting the carrier 10 to the platform 20. The fact that the actuators are identical renders the design process and the manufacturing easier and therefore less expensive, and also facilitates control of the position of the platform.

Each actuator 30 is linear, meaning it is suitable for generating a movement in translation.

More specifically, and with reference to FIGS. 1a to 3, each actuator 30 comprises:
- a first portion 31 connected to the platform 20 by a universal joint 310, meaning a connection along two axes of rotation that are substantially perpendicular to each other,
- a second portion 32 connected to the carrier 10 by a pivot connection 320,
- a motor 33, and
- a screw/nut type joint 34, interconnecting the first portion 31 and second portion 32.

The screw/nut joint 34 comprises a threaded screw 35 and a threaded nut 36 mounted on the screw. The first portion 31 of each actuator is integral to the threaded nut 36, and the second portion 32 is integral to the screw 35.

In addition, the universal joint 310 is adapted to prevent rotation of the first portion 31 about the axis of the linear actuator 30, i.e. about the axis of the screw/nut joint. Each universal joint 310 comprises a first piece 311 integral to the nut, an intermediate piece 312 mounted to rotate relative to the first piece about a respective first axis, of which an example is denoted X-X in FIGS. 2 and 3, and a third piece 313 integral with the platform, and mounted to rotate relative to the intermediate piece about a respective second axis that is perpendicular to the first, and of which an example is denoted Y-Y in FIG. 2. In one exemplary embodiment, the axes of rotation of the universal joint are advantageously perpendicular to the axis of the screw/nut joint. Blocking this rotation allows preventing rotation of the nut relative to the screw. Thus, the motor 33 rotating the screw causes, by this rotational blocking of the nut, the translational movement of the second portion 32 relative to the first 31.

It is therefore possible to control the platform in translation, by an identical and simultaneous translation of the three actuators 30, or to orient the platform by individually controlling each actuator to obtain the desired orientation, as in the position shown in FIG. 1a. This variable orientation of the platform 20 is made possible by the universal joints on the platform side and the pivot connections on the carrier side. In some embodiments, the screw/nut joint may be formed by a ball screw or by a roller screw. The use of this type of structure with screw/nut joints makes it possible to transmit movement only by rotation and not by translation in the device. Indeed, in space, sliding connections are not recommended because they present difficulties in controlling friction and play, as well as difficulties in confining the lubricant, which limit the service life of the mechanisms and reduce performance in terms of accuracy or stability.

In one advantageous embodiment, the screw/nut joints of the three linear actuators are formed by roller screws, which make it possible to obtain a finer control pitch than with ball screws, and therefore more precise control.

In such case, with reference to FIGS. 6a and 6b, the roller screw comprises the screw 35, comprising a shank 350 and a threaded rod 351, a threaded nut 36 being mounted on the threaded rod, the threaded nut 36 comprising a plurality of rollers 360 distributed around the screw. The roller screw is lubricated, typically with grease or oil. However, since the device 1 is to be used in space, it is necessary to avoid evaporation of the lubricant so that lubrication is maintained throughout the life span of the device, and also to avoid possible contamination of other devices or instruments located nearby. To achieve this, the roller screw comprises a sheath 37 extending around the screw 35 and the nut 36, and which comprises several portions arranged relative to one another so as to limit the escape of vaporized molecules of lubricant while allowing the relative movement of the second portion of the actuator with respect to the first.

Thus, in one embodiment, the sheath 37 comprises:
  a first portion 370, connected to the nut and covering the free end of the threaded rod 351 of the screw, this first portion being closed at the end located on the free end side of the threaded rod,
  a fixed second portion 371, covering the shank 350 of the screw,
  a third portion 372 slidably mounted on the second portion, and
  a fourth portion 373 connected to the nut, extending from the nut towards the shank of the screw so as to partly cover the third portion, and
the third and fourth portions of the sheaths are adapted to retain the lubricant in the sheath, and particularly between the fourth portion 373 of the sheath and the threaded rod of the screw. In particular, the third and fourth portions of the sheath form a baffle limiting the escape of lubricant. To achieve this, the third portion 372 of the sheath comprises, at its end closest to the nut, a peripheral flange 374 extending radially outwards. The fourth portion 373 of the sheath is dimensioned so as to have an inside diameter corresponding to the outside diameter of the end of the third portion at its peripheral flange, and it comprises, at its end closest to the shank of the screw, a peripheral flange 375 extending radially inwards, such that the inside diameter of this portion at the peripheral flange corresponds to the outside diameter of the third portion, this outside diameter being considered as excluding the peripheral flange 374 of larger diameter. The two flanges 374, 375 thus form obstacles to the escape of lubricant, in addition to forming a displacement-preventing stop which allows maintaining an overlap between the third and fourth portion. In addition, the sheath may include a spring 376 extending between the third and fourth portions, and in particular between the ends of these portions each located on the shank side of the screw, the spring making it possible to exert a force tending to move these two portions away from each other. This makes it possible both to force the third portion 373 to remain superimposed on the first 371, and to bring the peripheral flanges of the third and fourth portions closer together in order to reduce the length of the baffle formed by these flanges and therefore further reduce the risk of lubricant escaping.

Returning to FIGS. 1a, 1b, and 2, in one embodiment, the actuators are arranged, relative to the carrier 10 and to the platform 20, such that the carrier 10 and the platform 20 are each symmetrical with respect to a central symmetry, in order to facilitate control of the actuators.

For example, on the carrier 10 side, the actuators are arranged so that their bases, meaning the end of the second portion 32 located at the pivot connection 320, are evenly distributed on a circle passing through the axis of each actuator, the axis of the pivot connection 320 of each actuator preferably being tangent to the circle.

On the platform 20 side, the pieces 313 of each universal joint 310 that is connected to the platform are preferably evenly distributed over a circle, the axes of rotation of each piece 313 relative to the intermediate piece 312 of the universal joint being radial with respect to the circle.

The actuators 30 are therefore adapted to move the platform 20 relative to the carrier. In particular, the actuators 30 are arranged to move the platform 20 from and to a stacked position, shown in FIG. 1b, in which the platform 20 rests against the carrier 10. In this respect, the carrier is adapted to allow the platform to rest against it when the platform is in the stacked position. It may in particular comprise, as represented in the example of FIG. 1, support feet 11 which protrude from the wall of the spacecraft on which the device 1 is mounted. In one embodiment, the carrier 10 is adapted to have three support points, typically formed by three protruding support feet 11, the three support points being respectively adjacent to each linear actuator 30. The support points of the carrier are dimensioned to support the weight of the platform and of the equipment item mounted on the platform.

Figure 5:
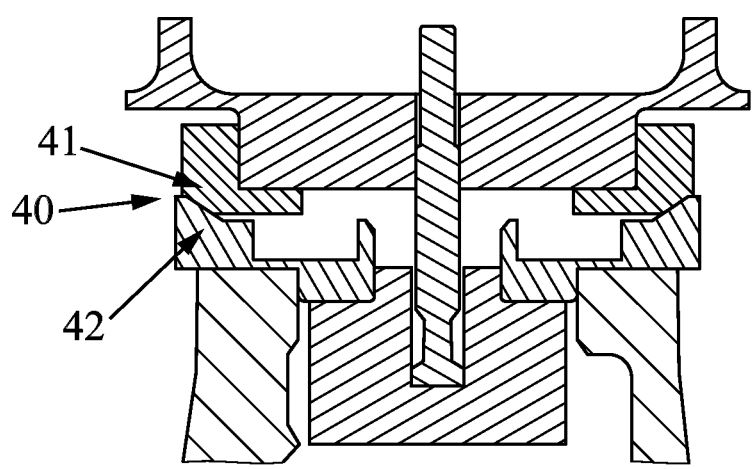
FIG. 5 shows an exemplary embodiment of a sphere/V connection used in a device for deploying and pointing according to one embodiment.

In addition, the carrier 10 and the platform 20 are adapted to be able to block the three degrees of freedom of the platform when the latter is in the stacked position. According to one embodiment, the carrier 10 and the platform 20 are adapted to establish, in the stacked position, three sphere-chute or sphere/V 40 type connections, represented in FIG. 5. A connection of the sphere-chute 40 type is a connection obtained by the contact of a sphere or an element having a locally spherical contour 41, formed for example by a surface of the platform 20 or by an element attached thereto, on a chute 42, formed for example in a foot 11 of the carrier, and which forms two points of contact. A sphere-chute connection allows translational movement along an axis of the chute, and rotation about three axes: it thus blocks translational movement along two axes perpendicular to those of the chute. The axes of the sphere-chute connections are therefore not parallel. For example, as the three sphere-chute connections are regularly distributed along a circle, for example a circle passing through the centers of the spheres 41, the axes of the connections can be radial to this circle. This triple connection forms a built-in connection which allows immobilizing the platform relative to the carrier. The use of three connections of the sphere-chute type means it is possible to achieve this result by using identical mechanical connections, which makes the device industrially simpler and less expensive to manufacture.

The device for deploying and pointing advantageously comprises a launch holding device which is suitable for exerting a pre-load on the platform 20 towards the carrier 10, when the platform is in the stacked position at launch, in order to hold the platform against the carrier despite the forces and vibrations induced by the launch. For example, according to a design known to those skilled in the art, the launch holding device may comprise one or more fusible link wires initially holding the platform against the carrier, the wire being burned once the device is in orbit in order to release the platform.

Furthermore, the built-in connection formed between the platform and the carrier creates degrees of static indeterminacy in the device as a whole. To minimize the stresses induced by this static indeterminacy, the support points between the carrier and the platform are positioned as close as possible to the linear actuators.

Figure 4:
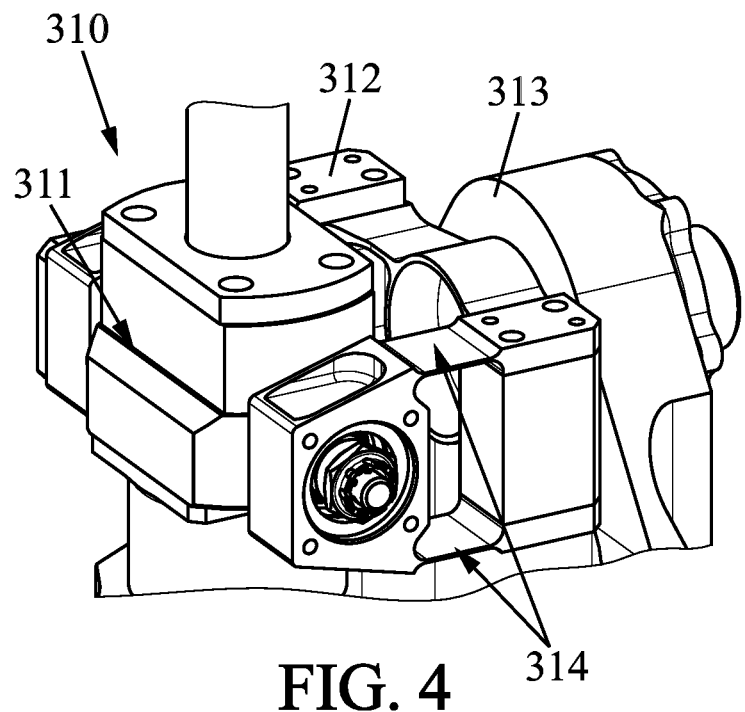
FIG. 4 shows an example of a universal joint used in a device for deploying and pointing according to one embodiment.

In addition, the entire device is dimensioned so that, in the stacked position, the forces and in particular the forces induced during launch, travel through the support points rather than through the linear actuators 30, or in other words, the forces traveling through the support points during launch are greater than those traveling through the actuators. In this respect, the support points are dimensioned to be able to withstand these forces. In addition, the linear actuators are adapted to reduce the forces they can transmit, by inserting flexible elements therein. With reference to FIG. 4, each universal joint type of connection 310 between a linear actuator and the platform may comprise flexible strips 314 intended to reduce the forces transmissible at this connection, and in particular forces along the axis of the actuator. In addition, the threaded screw 35 of the screw/nut joint 34 of each actuator 30 may also be dimensioned to reduce the forces that it can transmit, and in particular the forces transverse to the axis of the actuator, by presenting a sufficiently high length to diameter ratio, which must be determined on a case-by-case basis by a person skilled in the art according to the mass of the pointing equipment item, the forces acceptable by the screw, etc. Even so, it is understood that the induced flexibility must be limited so that good precision in the positioning of the platform in orbit is maintained, this accuracy having a direct impact on precision in the positioning of the equipment item mounted on the platform, and in the case of an optical instrument, on its sharpness. The person skilled in the art must therefore dimension the device in such a way that a compromise is established between flexibility of the linear actuators which allows directing the launch forces towards the support points in the stacked position, and sufficient rigidity to allow precise guidance of the platform.

The device 1 for deploying and pointing therefore makes it possible, by means of the mechanism described above, both to orient an equipment item precisely and according to control methods which can be simplified by the symmetry of the device and the identical nature of the actuators, and also to return the platform and the equipment item to a stacked position where holding at launch can be ensured. As a result, resistance to the forces generated by the launch is ensured without the need to overdesign or preload the actuators or the joints, which would increase the mass and the cost of the equipment item.

In one embodiment, the device is therefore initially mounted in a stacked position, the mobile platform being held against the carrier by means of a launch holding device. Once launched, the platform is released and the linear actuators can be controlled first to move the platform away from the carrier by means of a translational movement, for example perpendicular to the plane of the carrier, then to orient the platform and therefore the equipment item in at least one predetermined direction.

The device may comprise a control circuit board integrating a computer and a memory storing instructions necessary for controlling the actuators so as to execute a series of predefined movements. Alternatively, the device may comprise an interface for remote communication which allows receiving control instructions transmitted from a ground station.

LIST OF REFERENCES

1: device for deploying and pointing
10: carrier
11: support feet
20: mobile platform
30: linear actuator
31: first portion of the actuator
310: universal joint
311: connection piece integral with the nut
312: intermediate connection piece
313: connection piece integral with the platform
314: flexible strips
32: second portion of the actuator
320: pivot connection
33: motor
34: screw/nut joint
35: threaded screw
350: shank
351: threaded rod
36: threaded nut
360: rollers
37: sheath
370: first sheath portion
371: second sheath portion
372: third sheath portion
373: fourth sheath portion
374: peripheral flange of the third portion
375: peripheral flange of the fourth portion
376: spring
40: sphere-chute connection
41: spherical surface
42: chute
X-X: axis of rotation between first and second piece of a universal joint
Y-Y: axis of rotation between second and third piece of a universal joint

The invention claimed is:

1. A device for deploying and pointing an equipment item, comprising:
a mobile platform for receiving the equipment item,
a carrier integrally secured to a wall of a spacecraft, and three identical linear actuators connecting the carrier to the mobile platform,
the linear actuators are suitable for moving the mobile platform in translation along an axis and for orienting the mobile platform in rotation about two axes,
wherein each linear actuator includes:
a first portion connected to the mobile platform by a universal joint,
a second portion connected to the carrier by a pivot connection,
a motor, and
a screw and nut joint interconnecting the first and second portion,
the universal joint of each actuator is suitable for preventing rotation about an axis of the screw and nut joint, such that rotational actuation of a screw or nut by the motor causes a translational movement between the first and the second portion.

2. The device according to claim 1, wherein the linear actuators are suitable for moving the mobile platform between a stacked position and at least one operational position, and the carrier and the mobile platform are adapted such that, in the stacked position, the mobile platform bears against the carrier at three support points respectively adjacent to each linear actuator.

3. The device according to claim 2, wherein the mobile platform and the carrier are adapted to establish, in the stacked position, three sphere-chute type connections between the mobile platform and the carrier, the axes of the sphere-chute connections not are parallel to each other.

4. The device according to claim 3, wherein the three sphere-chute connections are evenly distributed over a circle, the axes of the chutes extending radially relative to the circle.

5. The device according to claim 2, further comprising a launch holding device suitable for holding the mobile platform, in the stacked position, against the carrier during launch of the spacecraft.

6. The device according to claim 2, the device further is dimensioned to allow, in the stacked position, a transmission of greater forces via the support points than via the linear actuators.

7. The device according to claim 6, wherein each universal joint comprises at least one flexible strip suitable for limiting the forces that are transmitted from the platform to the corresponding linear actuator.

8. The device according to claim 1, wherein the actuators are arranged, relative to the carrier and to a receiving platform, such that each among the carrier and the platform are symmetrical with respect to a central symmetry.

9. The device according to claim 1, wherein each screw/nut joint is formed by a roller screw.

10. The device according to claim 9, wherein the roller screw comprises: a screw, comprising a shank and a threaded rod; a threaded nut mounted on the threaded rod; and a sheath extending around the screw and the nut and housing a lubricant, the sheath comprising:
a first sheath portion connected to the nut and covering a free end of the threaded rod of the screw, the first sheath portion is closed at one end, said closed one end is located at the free end of the threaded rod,
a fixed second sheath portion covering the shank of the screw,
a third sheath portion slidingly mounted on the second sheath portion, and
a fourth sheath portion connected to the nut, and extending from the nut to the shank of the screw so as to partly cover the third sheath portion,
wherein the third and fourth sheath portions are adapted to prevent escaping of lubricant from the sheath.

11. A method for deploying the device according to claim 1, the device is mounted on a satellite, and initially is in a stacked position in which the mobile platform is resting against the carrier,
the method comprising:
controlling each linear actuator so as move the mobile platform in translation away from the carrier, from an initial stacked position in which the mobile platform is resting against the carrier, and
controlling each actuator to orient the platform in at least one predetermined direction.

12. A non-transitory computer-readable storage having stored thereon a computer program, comprising code instructions, the computer program is loadable into a processor and adapted to cause the processor to carry out, when the computer program is run by the processor, the method according to claim 11.

* * * * *